US010133404B2

(12) United States Patent
Chiang et al.

(10) Patent No.: US 10,133,404 B2
(45) Date of Patent: Nov. 20, 2018

(54) METHOD AND SYSTEM FOR PROCESSING PRESSURE SENSING SIGNAL (71) Applicant: TPK Touch Solutions (Xiamen) Inc., Xiamen (CN)

(72) Inventors: Cheng-Chung Chiang, Kaohsiung (TW); Feng Chen, Fujian (CN); Ho-Hsun Chi, Hsinchu (TW); Yuhwen Lee, Hsinchu (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 39 days.

(21) Appl. No.: 15/343,216

(22) Filed: Nov. 4, 2016

(65) Prior Publication Data
US 2017/0123580 A1 May 4, 2017

(30) Foreign Application Priority Data
Nov. 4, 2015 (CN) .......................... 2015 1 0743051

(51) Int. Cl.
*G06F 3/045* (2006.01)
*G06F 3/041* (2006.01)
(52) U.S. Cl.
CPC ............ *G06F 3/0416* (2013.01); *G06F 3/045* (2013.01); *G06F 3/0414* (2013.01); *G06F 3/0418* (2013.01); *G06F 2203/04105* (2013.01)

(58) Field of Classification Search
CPC .................. G06F 3/0416; G06F 3/045; G06F 2203/04105; G06F 3/0414; G06F 3/0418
USPC ........................................................ 345/173
See application file for complete search history.

(56) References Cited

U.S. PATENT DOCUMENTS

2013/0285970 A1\* 10/2013 Ahn ........................ G06F 3/044
345/173
2017/0052074 A1\* 2/2017 Watazu ..................... G01L 1/16

\* cited by examiner

Primary Examiner — Insa Sadio
(74) Attorney, Agent, or Firm — Cooper Legal Group, LLC (57) ABSTRACT The disclosure provides a pressure sensing signal processing method and system thereof. The pressure sensing signal processing method includes the below steps: acquiring the resistance; first-order differentiation on the recorded resistance-time curve and acquiring the corresponding slope value; matching the slope value with at least one predetermined database to acquire a pressing force gradient corresponding to the slope value; calculating and acquiring a pressing force based on the pressing force gradient. The system includes resistance detection module, differentiation processing module, comparison reference module and calculation module.

19 Claims, 6 Drawing Sheets

METHOD AND SYSTEM FOR PROCESSING PRESSURE SENSING SIGNAL

RELATED APPLICATIONS

This application claims priority to China Application Serial Number 201510743051.8, filed Nov. 4, 2015, which is herein incorporated by reference.

BACKGROUND

Technical Field

The present disclosure relates to a field of signal processing methods. More particularly, the present disclosure relates to methods and systems for processing a pressure sensing signal.

Description of Related Art

In recent years, with the increasing advance of touching sensing technology, a touch panel has become a necessary module in display devices. The touch panel which provides a pressure sensitive function has drawn more and more attention. In general, a resistance-type pressure sensitive module may include touch electrodes which are made from piezoresistive materials. By detecting a magnitude of electrical resistance variations of the touch electrodes after being pressed, the resistance-type pressure sensitive module may determine the magnitude of the pressing force based on resistance variations corresponding to the magnitude of the pressing force. However, an existing pressure sensitive module may generate signal noise affected by the environment. For example, under the influence of temperature variation, structural variation or environmental variation, the resistance of the pressure sensitive module may vary, so as to increase or reduce a magnitude of the signal, and such signal noise caused by ambient factors may result in pressure sensing distortions.

For example, the commonly-used piezoresistive material, indium tin oxide (ITO), may generate resistance variation caused by the temperature and another variations. Compared to the resistance variation of a deformation caused by the pressing force, the resistance variations due to environmental variation may not be ignored. The pressure sensitive module formed by indium tin oxide may detect a resistance variation ΔR after being pressed, but the resistance variation ΔR is a result of an interaction of the temperature and the deformation. The deformation is positively correlated to the pressing force, however, since the pressure sensitive module may not detect the temperature variation after being pressed, and the pressure sensitive module may not acquire the resistance variation caused by the temperature certainly, the pressure sensitive unit cannot eliminate the above ambient factors of the environmental variations to determine the magnitude of the pressing force based on the resistance variation alone.

In order to solve the above problems, a pressure sensitive module having a plurality of touch electrode layers may be utilized to determine the magnitude of the pressing force by processing a temperature compensation interaction between the touch electrode layers and calculating the resistance variation of the touch electrode layers. However, such a configuration requires an increase in the amount of piezoresistive materials and number of manufacturing processes, and may waste material and reduce the yield of products, while also increasing thickness of the pressure sensitive module, which may not conform to a trend toward thinner touch panels.

SUMMARY

In order to solve the above problems, the disclosure provides a pressure sensing signal processing method and a pressure sensitive module. The pressure sensing signal processing method at least includes following steps: Q11, acquiring a resistance of the pressure sensitive module and recording a resistance-time curve; Q12, performing first-order differentiation on the resistance-time curve to acquire a corresponding slope value $K_m$; Q13, matching the slope value $K_m$ with at least one predetermined database and acquiring a pressing force gradient $\Delta F_n$ corresponding to the slope value $K_m$; and Q14, calculating and acquiring a pressing force $F_n$ based on the pressing force gradient $\Delta F_n$ and a pressing condition.

The disclosure also provides a pressure sensing signal processing system. The pressure sensing signal processing system includes a pressure sensitive module configured to detect a pressing force, a resistance detection module configured to acquire a resistance of the pressure sensitive module, a differentiation processing module configured to perform first-order differentiation on a resistance-time curve of the pressure sensitive module to acquire a corresponding slope value $K_m$, a comparison reference module configured to match the slope value $K_m$ with at least one predetermined database to acquire a pressing force gradient $\Delta F_n$ corresponding to the slope value $K_m$, and a calculation module configured to calculate and acquire a pressing force $F_n$ based on the pressing force gradient $\Delta F_n$.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Reference will now be made in detail to the present embodiments, examples of which are illustrated in the accompanying drawings. Wherever possible, the same reference numbers are used in the drawings and the description to refer to the same or like parts.

Figure 1A:
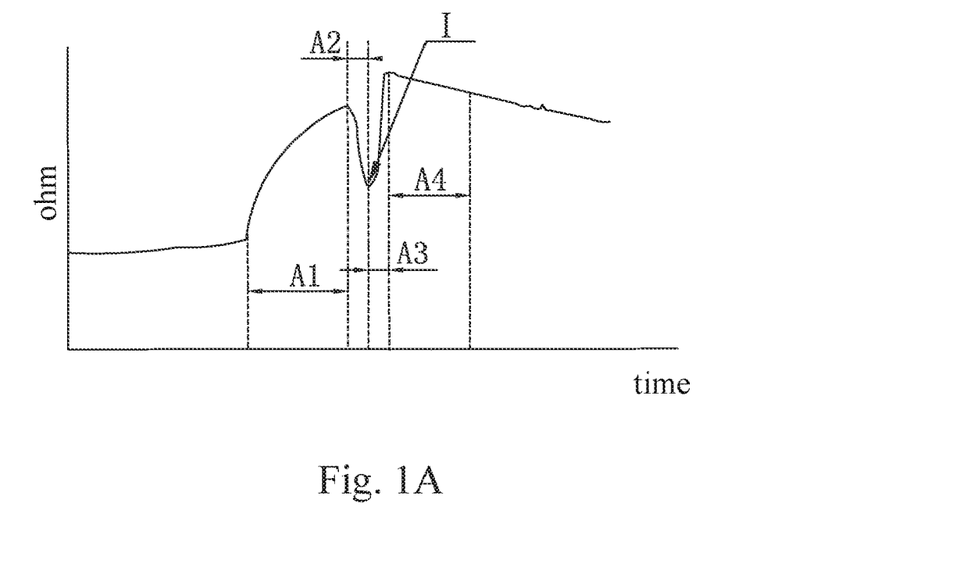
FIG. 1A is a resistance-time curve of a pressure sensitive module after being pressed by a single pressing of a finger.
Figure 1B:
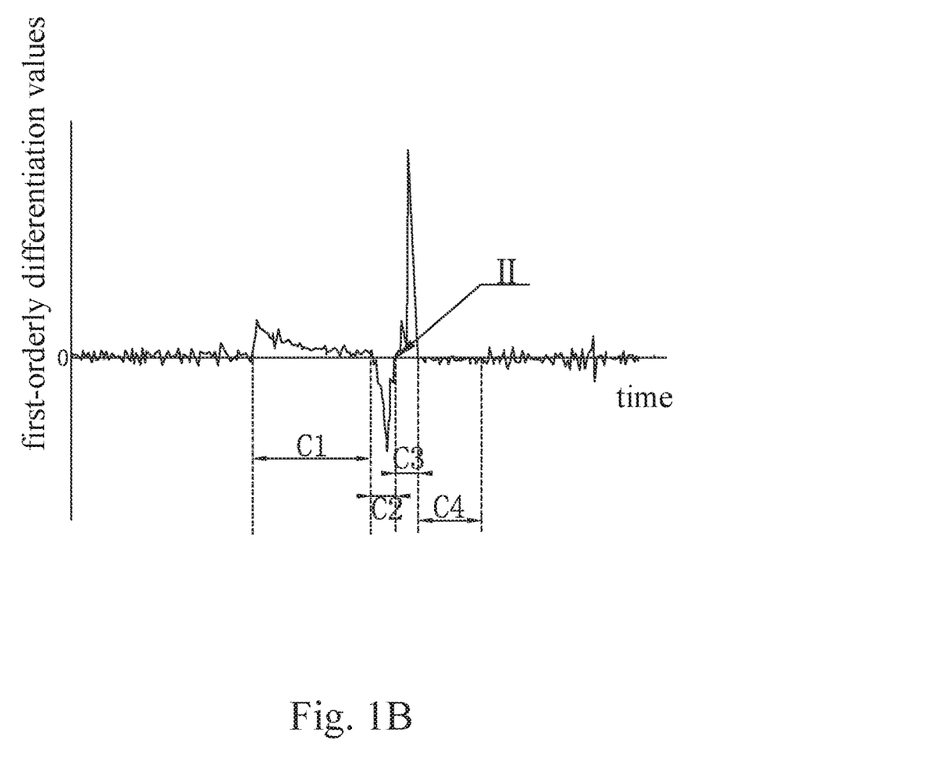
FIG. 1B is a first-order differentiation curve of the resistance-time curve of FIG. 1A.

Reference is made to FIG. 1A and FIG. 1B, which are variation curves of a pressure sensitive module after being pressed by a single pressing of a finger. The pressure sensitive module includes a transparent conductive oxide material, such as metal oxide like indium tin oxide (ITO), or the like. When temperature increases, a resistance of the pressure sensitive module may increase. When the pressure sensitive module is deformed by the pressing, the resistance of the pressure sensitive module may decrease. More particularly, FIG. 1A is a resistance-time curve of a pressure sensitive module after the pressure sensitive module is pressed by a single press of a finger. FIG. 1B is a resistance slope-time curve which is first-order differentiation curve of the resistance-time curve of FIG. 1A. It will be apparent to those skilled in the art that although the present disclosure only shows the resistance-time curve and a resistance slope-time curve, mere detection and calculation of the resistance are not a requirement in practical applications. In practical detection and differential calculation processing, current signals and voltage signals may be detected in accordance with a certain relation to determine resistance variations. In other words, the detection, recordation and calculation of the resistances may be applied to the detection, recordation and calculation of the current signals and the voltage signals. As shown in FIG. 1B, there is a significant peak of a negative slope after the pressure sensitive module is pressed by a finger. When a magnitude of a pressing force is larger, an absolute value of the peak of the negative slope may be larger. When the finger withdraws, the pressure sensitive module may spring, generating a large springing force, which is a significant peak of a positive slope.

The resistance variation may not only be affected by the pressing force after the pressure sensitive module is pressed by a finger, but the resistance variation may also be affected by other ambient factors. Those ambient factors may cause an upward or downward trend in the resistance variation of the pressure sensitive module. In particular, when the pressure sensitive module is pressed by the single press of the finger, the variation processing of the resistance-time curve and the resistance slope-time curve at least include the following steps.

A first step: Before the pressure sensitive module is touched by the finger, the pressure sensitive module has a certain initial resistance $R_0$; during the pressure sensitive module being touched and pressed, the resistance of the pressure sensitive module is as shown in a section A1 of FIG. 1A (which shows a rising processing in FIG. 1A and FIG. 1B), and the corresponding resistance slope variation is as shown in a section C1 of FIG. 1B; the upward processing of the resistance is due to a temperature difference between the finger and the pressure sensitive module (the temperature of the finger is greater than that of the pressure sensitive module in FIG. 1A and FIG. 1B). The temperature of the finger may increase the temperature of the pressure sensitive module, which may cause the resistance to become larger. It is noted that the first step spends a time period of detection to distinguish the influence of touching and pressing on the resistance. In a practical pressing process, the first step only spends a short time, and this step may encounter other ambient factors that generate positive or negative slope variations.

A second step: After the pressure sensitive module is pressed by the finger, the resistance of the pressure sensitive module is as shown in a section A2 of FIG. 1A: a rapid decline in the processing. As shown in FIG. 1A, a point I shows a lowest point of the resistance-time curve, and this point represents a force balance point after the pressure sensitive module is pressed by the finger. The pressure sensitive module has a maximum deformation at the point I. The resistance slope variation corresponding to the section A2 is a negative peak as shown in FIG. 1B, in which, a point II in FIG. 1B is a resistance slope variation of zero, which represents the force balance point after the pressure sensitive module is pressed by the finger.

A third step: After the finger withdraws from the pressure sensitive module, the resistance of the pressure sensitive module is as shown in a section A3 of FIG. 1A having a deformation recovery which is an elasticity of the pressure sensitive module after the pressure sensitive module is pressed. A resistance variation caused by the elasticity is equal to the resistance variation caused by the pressing of the finger. As shown at the section C3 of FIG. 1B, the resistance slope variation is positive.

A fourth step: After the finger withdraws from the pressure sensitive module and the deformation of the pressure sensitive module disappears fully, the pressure sensitive module is in a natural cooling process. Since the resistance of the pressure sensitive module is positively correlated to the temperature, thus as shown at the section A4 of FIG. 1A, the resistance of the pressure sensitive module may decrease over time, so as to react on a section C4 of FIG. 1B, and the slope of the resistance variation is slightly negative.

Reference is made to FIG. 1A and FIG. 1B, comparing a magnitude of resistance slope variation in the first step (as shown at the section A1 of FIG. 1A) to that of the resistance slope variation in the second step (as shown at the section A2 of FIG. 1A). It is to be understood, in the first step, the resistance variation caused by the ambient factors such as temperature, materials or structures is less than the resistance variation caused by the pressing force in the second step. As a result, after the resistances are differentially calculated, the resistance variation caused by the ambient factors may be negligible.

Figure 2A:
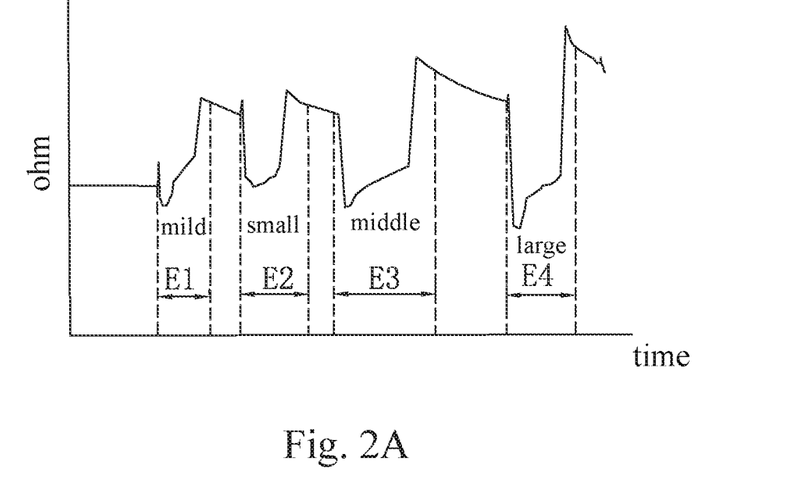
FIG. 2A is a resistance-time curve of a pressure sensitive module after being several presses of a finger.
Figure 2B:
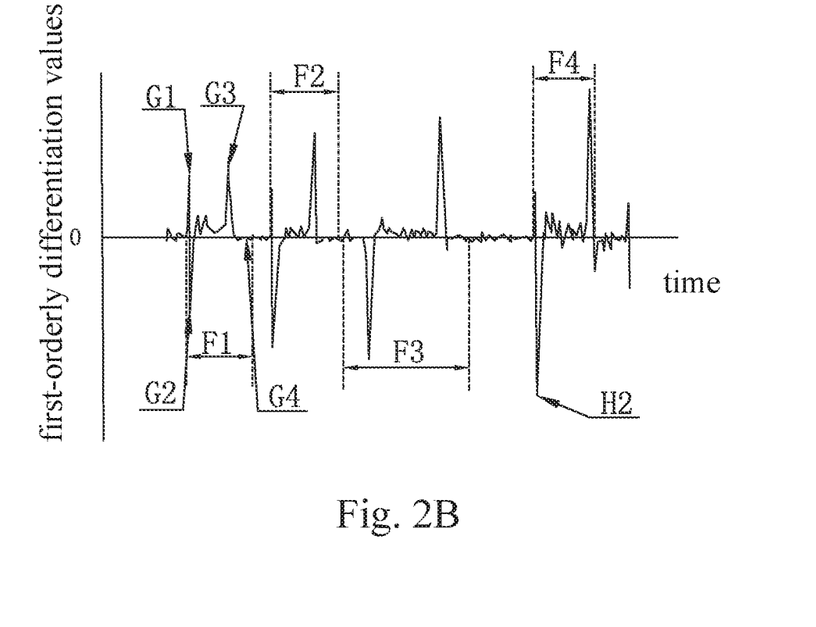
FIG. 2B is a first-order differentiation curve of the resistance-time curve of FIG. 2A.

Reference is made to FIG. 2A and FIG. 2B. FIG. 2A is a resistance-time curve after the pressure sensitive module is pressed several times by the finger and FIG. 2B is a resistance slope-time curve corresponding to FIG. 2A. Each of the presses may be respectively divided into four pressing force levels, such as a mild-intensity press (as shown at a section E1 of FIG. 2A), a small-intensity press (as shown at a section E2 of FIG. 2A), a middle-intensity press (as shown at a section E3 of FIG. 2A), and a large-intensity press (shown at a section E4 of FIG. 2A).

The resistance-time curve as shown at the sections E1, E2, E3 and E4 of FIG. 2A may respectively correspond to the resistance slope-time curve as shown at sections F1, F2, F3 and F4 of FIG. 2B after the pressure sensitive module is pressed by the finger. As shown in FIG. 2A and FIG. 2B, the mild-intensity press, the small-intensity press, the middle-intensity press and the large-intensity press may include the four steps in FIG. 1A and FIG. 1B as described above. Taking the mild-intensity press for instance, as shown at section F1 of FIG. 2B:

as described above, a location G1 where the resistances show the upward trend (that is, the slope of the resistances is positive) may be mainly caused by the temperature of the finger (or the resistances may be superimposed with another ambient factors), and the resistance variation at the location G1 may display a positive peak value;

a location G2 where the resistances shows the downward trend may be caused by the pressing force after the pressure sensitive module is pressed, and the resistance variation at the location G2 may display a negative peak value;

a location G3 where the variation in resistances shows the upward trend may be caused by the deformation recovery of the pressure sensitive module after the finger leaves the pressure sensitive module, and the resistance variation at the location G3 may display a larger positive peak value;

a location G4 where the resistances variation shows the downward trend (that is, the slope of the resistances is negative) may be caused by a decrease of temperature after the finger leaves the pressure sensitive module, and the resistance variation at the location G3 may display a smaller negative peak value.

As shown in FIG. 2A and FIG. 2B, it is clear that a process of the small-intensity press, the middle-intensity press and the large-intensity press may also similarly be divided into the four steps as described above, and, therefore, a description thereof is not repeated.

As shown at the location G2 of a section F1 of FIG. 2B and a location H2 of a section F4 of FIG. 2B, the locations G2 and H2 may be points where the mild-intensity press and the large-intensity press are in force balance. Corresponding to the locations G2 and H2, the pressure sensitive module has a maximum deformation. As shown in FIG. 2B, it is clear that the resistance slope variation after the pressure sensitive module is mildly pressed by the finger (as shown at the location G2) is less than the resistance slope variation after the pressure sensitive module is largely pressed by the finger (as shown at the location H2).

It is noted that different intensity of the pressing force may correspond to different resistance slope variation, and an absolute value of the resistance slope variation is positively correlated to the intensity of the pressing force.

Figure 3A:
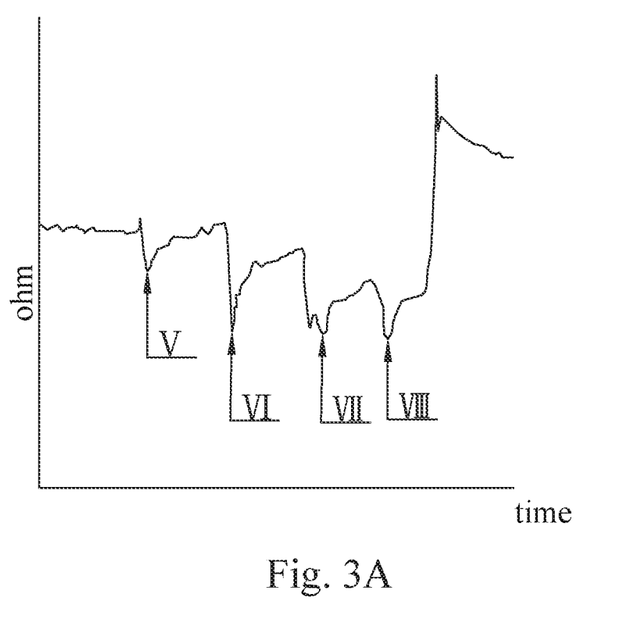
FIG. 3A is a resistance-time curve of a pressure sensitive module after being pressed by a gradually single pressing of a finger.
Figure 3B:
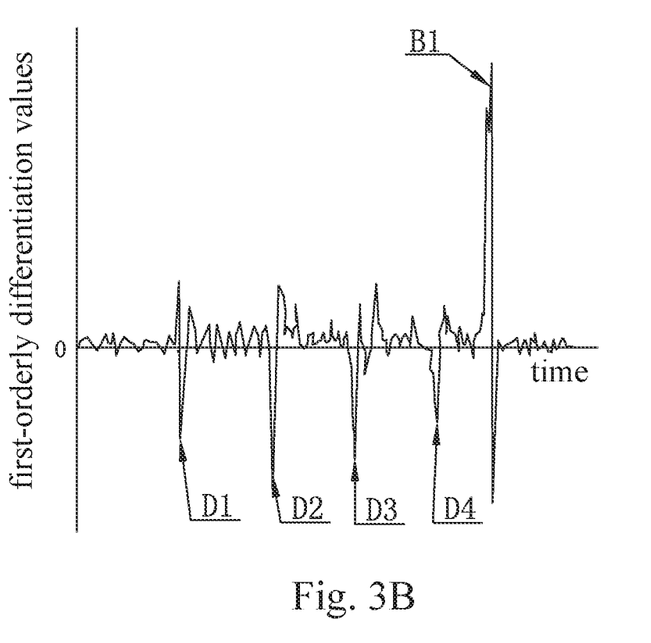
FIG. 3B is a first-order differentiation curve of the resistance-time curve of FIG. 3A.

Reference is made to FIG. 3A and FIG. 3B. FIG. 3A is a resistance-time curve of a pressure sensitive module after the pressure sensitive module is pressed by the single press of the finger. FIG. 3B is a resistance slope-time curve which is a first-order differentiation curve of the resistance-time curve of FIG. 3A. The main difference between FIG. 3A-FIG. 3B and FIG. 1A-FIG. 1B is that FIG. 3A and FIG. 3B make the single press become a gradually single press based on different steps of the press, which is, the finger may not leave a touch surface corresponding to the pressure sensitive module, and the finger may gradually increase the intensity of the pressing force to reach the force balance. The main difference between FIG. 3A-FIG. 3B and FIG. 2A-FIG. 2B is that: FIG. 3A and FIG. 3B make the mild-intensity press, small-intensity press, the middle-intensity press and the large-intensity press become a gradually single press which may have the four pressing force levels at different time. Due to this difference, FIG. 3A may merely have one largely positive peak value caused by the finger withdrawing and the recovery of the deformation after the pressure sensitive module is largely pressed. Points V, VI, VII, and VIII of FIG. 3A corresponds to the mild-intensity press, the small-intensity press, the middle-intensity press, and the large-intensity press in sequence. As shown in FIG. 3B, the four of the pressing force may cause four negative peaks of the resistance slope (as shown at locations D1, D2, D3 and D4 of FIG. 3B). FIG. 3B is different from FIG. 2B, which has a plurality of positive peaks when the pressure sensitive module is pressed several times by the finger, and FIG. 3B merely has one obviously positive peak (as shown at a location B1 of FIG. 3B) to determine an end of the single press. Before the end of the four pressing force levels of the pressing process, the four negative peaks respectively correspond to the difference of the pressing force between the foregoing pressing force level and the present pressing force level. As a result, as shown in FIG. 3A and FIG. 3B, the different resistance slope variation is positively correlated to the gradient of the different pressing force level, that is, the negative resistance slope corresponds to a magnitude of the pressing force gradient $\Delta F$.

Utilizing a method for first-order differentiation of the resistance-time curve may reduce the resistance variation caused by the ambient factors, and it may calculate the magnitude of the pressing force more exactly.

Figure 4:
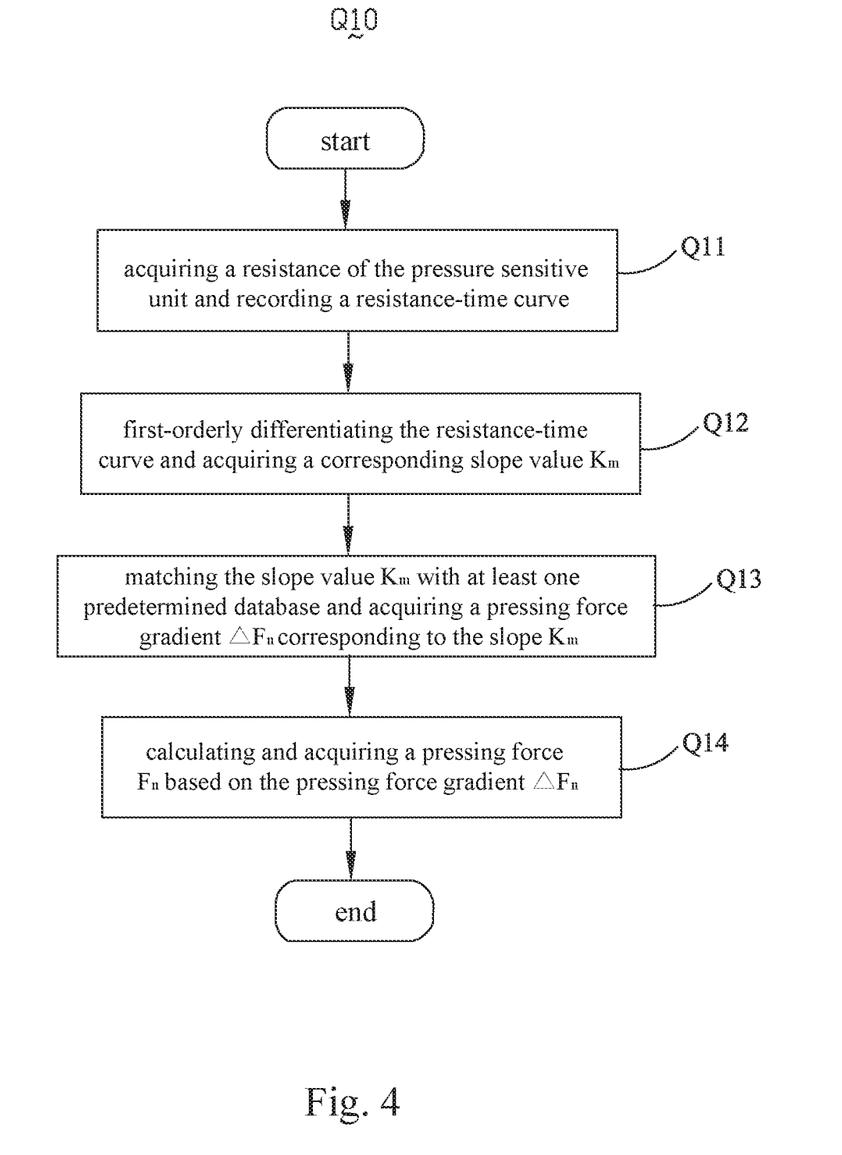
FIG. 4 is a flow chart of at least one embodiment of the method for processing the pressure sensing signal.

Reference is made to FIG. 4. The disclosure provides a pressure sensing signal processing method and a pressure sensitive module. The pressure sensing signal processing method Q10 may include the following steps:

Q11, acquiring a resistance of the pressure sensitive module and recording a resistance-time curve;

Q12, performing first-order differentiation of the resistance-time curve to acquire a corresponding slope value $K_m$;

Q13, matching the slope value $K_m$ with at least one predetermined database and acquiring a pressing force gradient $\Delta F_n$ corresponding to the slope $K_m$ (that is, a pressing force difference between the present pressing force and the foregoing pressing force);

Q14, calculating and acquiring a pressing force $F_n$ based on the pressing force gradient $\Delta F_n$.

Before step Q11, the pressure sensing signal processing method may further include the following steps:

S101, providing a system and continuously scanning a touch electrode;

S102, determining whether a touched position signal is detected; if yes, go into step Q11, if no, repeatedly perform step S101.

In step Q11, acquiring the resistance of the pressure sensitive module may include acquiring an initial resistance $R_0$ and a resistance $R_m$ during the pressing process of the finger. Values of m of the resistance $R_m$ may be 1, 2 ... m−1 and m.

In step Q12, acquisitions of time t, and time intervals to acquire and record the resistance $R_m$ of the pressure sensitive module may be adjusted based on practical requirements of a pressure sensing signal detection and processing, but it is not limited.

In step Q13, values of n of the pressing force gradient $\Delta F_n$ may be 1, 2 ... n−1 and n.

During steps Q11-Q14, the pressure sensing signal processing method Q10 may continuously acquire the resistances, perform first-order differentiation on the resistance-time curve, acquire the slope value Km, and match the slope value Km with at least one predetermined database at the same time until an end of a pressing force calculation cycle (that is, when the finger withdraws from the pressure sensitive module).

Based on the resistances corresponding to the different magnitudes of the pressing force and the slope values $K_m$ of the resistance variations, the predetermined database may analogize the pressing force gradient $\Delta F_n$ corresponding to the slope value $K_m$, and integrate the above slope value $K_m$ and the corresponding pressing force gradient $\Delta F_n$ into the predetermined database and form predetermined values of the predetermined database. In some preferred embodiments, the predetermined database may analogize in accordance with the relevant conditions of a pressure sensitive module, such as a material, a structure and/or a sensitivity, so as to acquire the targeted predetermined database.

In step Q14, the pressing force $F_n$ may be acquired by a following equation (1). Particularly, the equation (1) is described below:

$$F_n = F_{n-1} + \Delta F_n \quad (1);$$

A pressing force $F_{n-1}$ indicates the pressing force at a time prior to a time corresponding to the pressing force $F_n$, in which, n is 1, 2 ... n−1 and n. When n=1, the above equation (1) may be $F_1 = F_0 + \Delta F_1$, and $F_0 = 0$. By matching the acquired slope value $K_m$ with the predetermined database, the pressing force gradient $\Delta F_1$ may be acquired, so as to acquire the pressing force F by calculating the above equation(1).

In some embodiments, the predetermined database may have a data calibration function, and the data in step Q12 may go into the predetermined database, so the data after being calibrated may be used in the following comparison, matching and analysis of the slope value $K_m$.

In other embodiments, the pressure sensitive module may further combine with a position sensitive module. After the touched position signal is acquired by detecting the touched position signal, processing of the pressure sensing signal begins. As a result, three-dimensional detection may be achieved simultaneously, and taking the acquisition of the touched position signal as a switch to turn on the pressure sensing signal may further save energy.

Furthermore, in order to achieve more exact processing and analysis of the pressure sensing signal, a validity of the acquired resistance of the pressure sensitive module, and a validity of the acquired slope value $K_m$ by first-order differentiation of the resistance may be further determined, and the pressure sensing signal processing method Q10 may be further refined.

Figure 5:
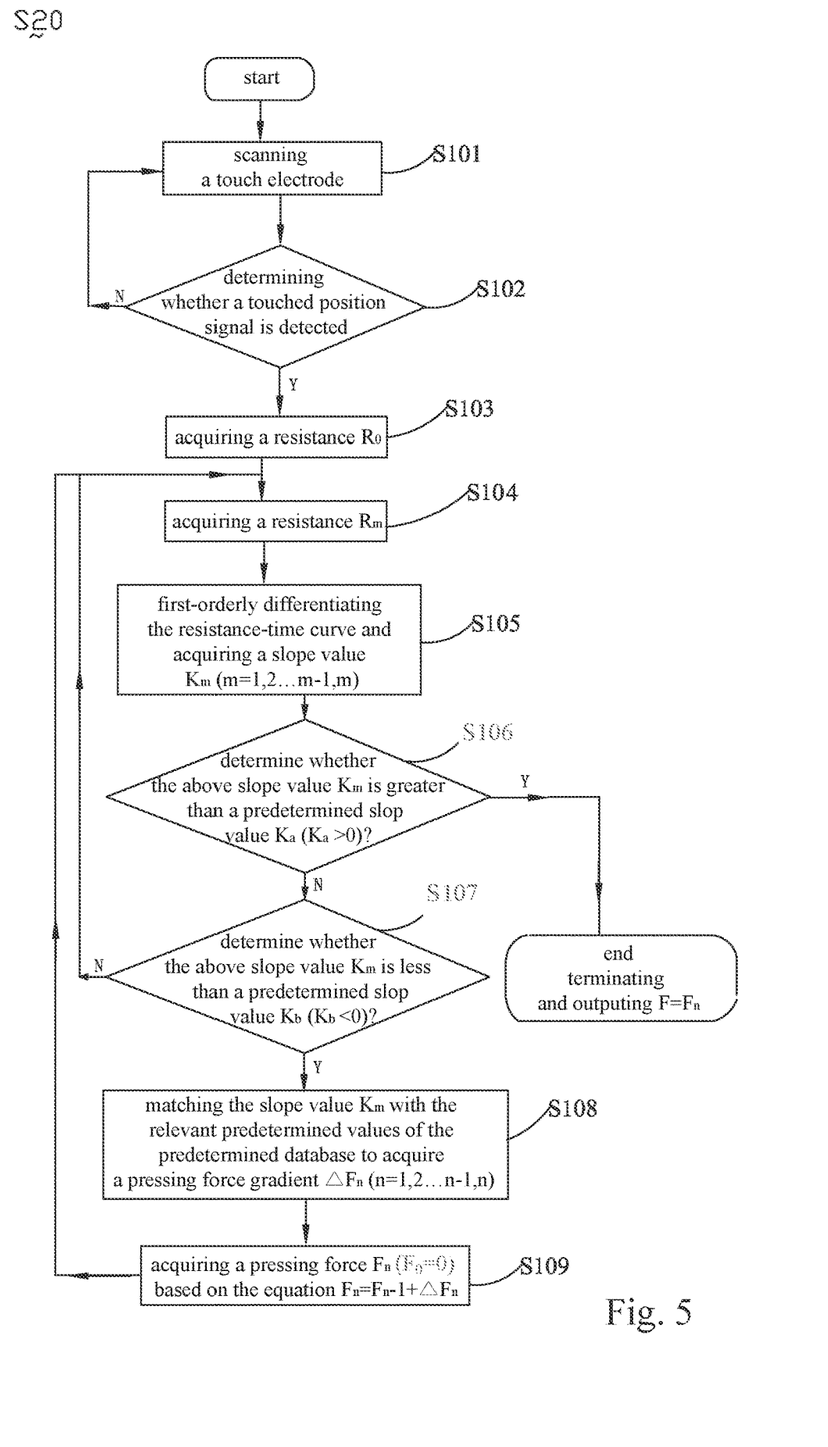
FIG. 5 is a flow chart of at least one embodiment of the method for processing the pressure sensing signal.

Specifically, reference is made to FIG. 5, in some embodiments of the present disclosure provides a pressure sensing signal processing method S20 and a pressure sensitive module. The pressure sensing signal processing method S20 may further include the following steps:

S101, scanning the touch electrode;

S102, determining whether the touched position signal of the single pressing is detected; if yes, going into a step S103, if no, repeating step S101;

S103, acquiring and recording a resistance $R_0$ of the pressure sensitive module;

S104, acquiring a resistance $R_m$ of the pressure sensitive module and recording a resistance-time curve;

S105, performing first-order differentiation on the resistance-time curve and acquiring a corresponding slope value $K_m$;

S106, determining whether the above slope value $K_m$ is greater than a predetermined slope value $K_a$; if yes, finishing calculating; if not, going into step S107;

S107, determining whether the above slope value $K_m$ is less than a predetermined slope value $K_b$; if yes, going into a step S108; if not, repeating step S104 and acquiring a next resistance $R_{m+1}$;

S108, matching the slope value $K_m$ with the relevant predetermined values of the predetermined database, so as to acquire a pressing force gradient $\Delta F_n$, and returning to step S104; and S109, after acquiring a corresponding pressing force $F_n$ based on the equation (1), finishing the present calculation.

In some embodiments, the range of the values n and m corresponding to the resistance $R_m$ of the pressure sensitive module, the slope value $K_m$, the pressing force gradient $\Delta F_n$, and pressing force $F_n$ may be equal to that of the previously described embodiments. Furthermore, the predetermined database may be similar with that described above, and, therefore, a description thereof is not repeated. Furthermore, the pressure sensing signal processing method S20 may continuously acquire the resistances, perform first-order differentiation on the resistance-time curve, acquire the slope value Km, and match the slope value Km with at least one predetermined database at the same time until an end of a pressing force calculation cycle.

The predetermined slope value $K_a$ and the predetermined slope value $K_b$ may be acquired by simulating conditions of different ambient factors. The predetermined slope value $K_a$ is the resistance slope of a maximum resistance variation of the pressure sensitive module while the pressure sensitive module is affected by the ambient factors, and the predetermined slope value $K_a$ is greater than zero. In some particular embodiments, the predetermined slope value $K_a$ may be adjusted based on the practical pressure sensitive module (including a material, a structure and/or a sensitivity). The predetermined slope value $K_b$ is the resistance slope of a minimum resistance variation of the pressure sensitive module while the pressure sensitive module is affected by the ambient factors, and the predetermined slope value $K_b$ is less than zero.

In some embodiments, the predetermined slope value $K_a$ and the predetermined slope value $K_b$ may be expressed as the resistance slope when the finger is within an applicable range of a temperature difference (the temperature difference may indicate temperatures between a pressing object and the pressure sensitive module). At a maximum temperature difference, when the finger merely contacts the pressure sensitive module (that is, without the finger pressing), the temperature of the finger may be transmitted to the pressure sensitive module to generate the resistance slope variation. When the temperature of the pressing object is greater than the temperature of the pressure sensitive module, the generated resistance slope value is positive, and the predetermined slope value $K_a$ may be acquired; when the temperature of the pressing object is less than the temperature of the pressure sensitive module, the generated resistance slope value is negative, and the predetermined slope value $K_b$ may be acquired. It is clear that the ambient factors as described above are not limited to the temperature difference between the pressing object and the pressure sensitive module. The sensitivity of the detection system may further be included, which may have its own sensitivity fluctuation causing the positive peak of the resistance slope, the negative peak of the resistance slope, and the factor of the fast pressing which may make the pressure sensitive module rebound causing the resistance slope variation. In practical applications, the predetermined slope values $K_a$ and $K_b$ may be adjusted based on the practical pressure sensitive module.

Steps S106 and S107 as described above may have a function of judging the validity of the slope values $K_m$ corresponding to the pressing force. In some embodiments, the order of steps S106 and S107 may be adjusted based on characteristics of the practical ambient factors. In some embodiments, for example, the ambient factors may cause all positive impacts or all negative impacts on the resistances, and one of steps S106 or S107 may be chosen to be processed.

In the present embodiment, since the finger may press the pressure sensitive module by different ways generating the different pressure sensing signals, the practical steps of the pressure sensing signal detection may be different.

Based on different ways for applying pressing forces, the ways for applying pressing forces may be divided into at least three types: a single pressing, a several-times pressing, and a gradually single pressing.

A first variation of some embodiments of the present disclosure is as follows:

when the pressure sensitive module is pressed by the single pressing of the finger, the specific way for applying the pressing force is as shown in FIG. 1A and FIG. 1B. In the present example, a pressure sensing signal processing method S20a is: when the finger touchs the pressure sensitive module, the pressure sensing signal processing method S20a may be triggered and the signal position of the touch may be acquired by the touch electrodes. After acquiring the initial resistance $R_0$, the pressure sensing signal processing method S20a may continue to acquire the next resistance $R_1$. Then, the pressure sensing signal processing method S20a may acquire the slope value $k_1$ of resistance $R_0$–$R_1$ by first-order differentiating the resistances $R_0$ and $R_1$ of the pressure sensitive module;

determination is made whether the slope value $k_1$ is greater than the predetermined value $k_a$; if so, the resistance $R_1$ of the pressure sensitive module is not in the range of pressure sensing signals required to be calculated, and the corresponding calculation of the pressing is stopped; if not, further determination whether the slope value $k_1$ is less than the predetermined value $k_b$ is required; if the slope value $k_1$ is less than the predetermined value $k_b$, the resistance $R_1$ of the pressure sensitive module is not in the range of pressure sensing signals required to be calculated, the next resistance $R_m$ is repeatedly acquired; if not, the corresponding calculation of the pressing and final acquisition of the pressing force F1 are performed.

In some embodiments, the output signal of the pressing force F is equal to F1. That is, the pressing force F1 is the pressing force corresponding to the single press.

Furthermore, the time interval between acquiring the resistance $R_m$ of the pressure sensitive module and that of the resistance $R_{m+1}$ is the same as the time interval between acquiring the resistance $R_{m+1}$ and the resistance $R_{m+2}$, but the specific time interval may be adjusted based on practical requirements of a pressure sensing signal detection and processing. In some embodiments, the time interval is determined by the calculation frequency and speed of the system, but it is not limited.

Some embodiments of the present disclosure are configured as follows:

the pressure sensitive module is pressed several times by the finger instead of being repeated until finishing all the pressings. The section E1, the section E2, the section E3 and the section E4 of FIG. 2A may all be a single pressing cycle.

Each single pressing cycle may meet a condition of the finger touching, the finger pressing and the finger withdrawing. One single pressing cycle may acquire one pressing force $F_n$, as shown in FIG. 2A and FIG. 2B, four different pressing force levels may respectively acquire a first mild pressing force, a second small pressing force, a third middle pressing force, and a fourth large pressing force. By acquiring the magnitudes of the pressing forces $F_n$ or acquiring the time interval of the pressing forces $F_n$, different pressure sensing signals may be acquired by subsequent processes, so the system may realize different operations.

Some embodiments of the present disclosure are configured as follows:

the pressure sensitive is pressed by a gradual single press of the finger. That is, after the pressure sensitive module is pressed by a first pressing force gradient $\Delta F_1$ until the force balances (at this time, the pressing force $F_1$ is equal to the first pressing force gradient $\Delta F_1$), the pressure sensitive module may not be separated from the finger, but a second pressing force gradient $\Delta F_2$ to $F_2$ ($F_2 = F_1 + \Delta F_2$) is added to reach a new force balance. Then, the finger may respectively add a third pressing force gradient $\Delta F_3$ to $F_3$ ($F_3 = F_2 + \Delta F_3$), add a fourth pressing force gradient $\Delta F_4$ to $F_4$ ($F_4 = F_3 + \Delta F_4$). After the pressure sensitive module reaches the final force balance, the finger may withdraw from the pressure sensitive module. As shown in FIG. 3A, the pressure sensitive module is pressed by the gradually single pressing of the finger (as shown at points V, VI, VII and VIII of FIG. 3A), and finally the output pressing force is $F_4$.

In order to achieve better processing and analysis of the pressure sensing signal, the present disclosure may further limit the pressure sensing signal processing system.

Figure 6:
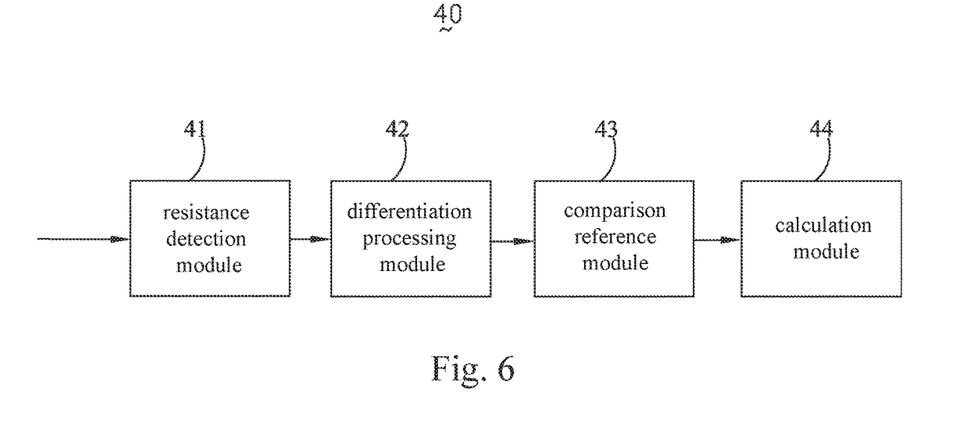
FIG. 6 is a structure diagram of at least one embodiment of the system for processing the pressure sensing signal.

Reference is made to FIG. 6. In some embodiments, a pressure sensing signal processing system 40, sequentially including a pressure sensitive module, a resistance detection module 41, a differentiation processing module 42, a comparison reference module 43 and a calculation module 44 is included.

The pressure sensitive module is configured to detect the pressing force. The resistance detection module 41 is configured to acquire the resistances $R_0$ and $R_m$ of the pressure sensitive module. The differentiation processing module 42 is configured to first-order differentiate the resistance-time curve (including the acquired resistances $R_0$ and $R_m$ of the pressure sensitive module) and acquire a corresponding slope value $K_m$. The comparison reference module 43 is configured to match the slope value $K_m$ with at least one predetermined database and acquire a pressing force gradient $\Delta F_n$ corresponding to the slope value $K_m$. For example, taking a common piezoresistive material, the transparent conductive metal oxide such as indium tin oxide (ITO), as an instance, the pressure sensitive module is formed by this material. First, the predetermined slope value $K_a$ and the predetermined slope value $k_b$ are measured in the maximum temperature difference within the applicable range (or another ambient factor). Then, the correspondence between the pressing force gradient and the slope value are acquired by pressing the pressure sensitive module with different pressing forces. In the comparison reference module 43, when the slope value $k_m$ is greater than the predetermined slope value $k_b$, the pressing force gradient $\Delta F_n = 0$ N may be determined; and when the slope value $k_m$ is less than the predetermined slope value $k_b$, the relative details are as shown in table 1:

Table 1 is the correspondence between the pressing force gradient and the slope value.

| Number | $\Delta F_n$/N | Slope value |
|---|---|---|
| 1 | 0.5 | −1757430 |
| 2 | 1.0 | −2615129 |
| 3 | 1.5 | −3305719 |
| 4 | 2.0 | −4467252 |

Reference is made to Table 1. When the slope value $K_m$ is about −1757430, the magnitude of corresponding pressing force gradient $\Delta F_n$ is about 0.5N;

when the slope value $K_m$ is about −2615129, the magnitude of corresponding pressing force gradient $\Delta F_n$ is about 1.0N;

when the slope value $K_m$ is about −3305719, the magnitude of corresponding pressing force gradient $\Delta F_n$ is about 1.5N;

when the slope value $K_m$ is about −4467252, the magnitude of corresponding pressing force gradient $\Delta F_n$ is about 2.0N, and so on.

The pressing force gradient $\Delta F_n$ and the corresponding slope value as shown in Table 1 are merely exemplary. In practical applications, the data shown in Table 1 may be stored in the predetermined database, and pressing force gradient $\Delta F_n$ corresponding to the acquired slope value $k_m$ may be acquired based on the predetermined database.

The calculation module 44 is configured to calculate and acquire the pressing force $F_n$ based on the pressing force gradient $\Delta F_n$. The equations and the relative parameters are similar to those described above, and, therefore, repeated description thereof is not made.

Figure 7:
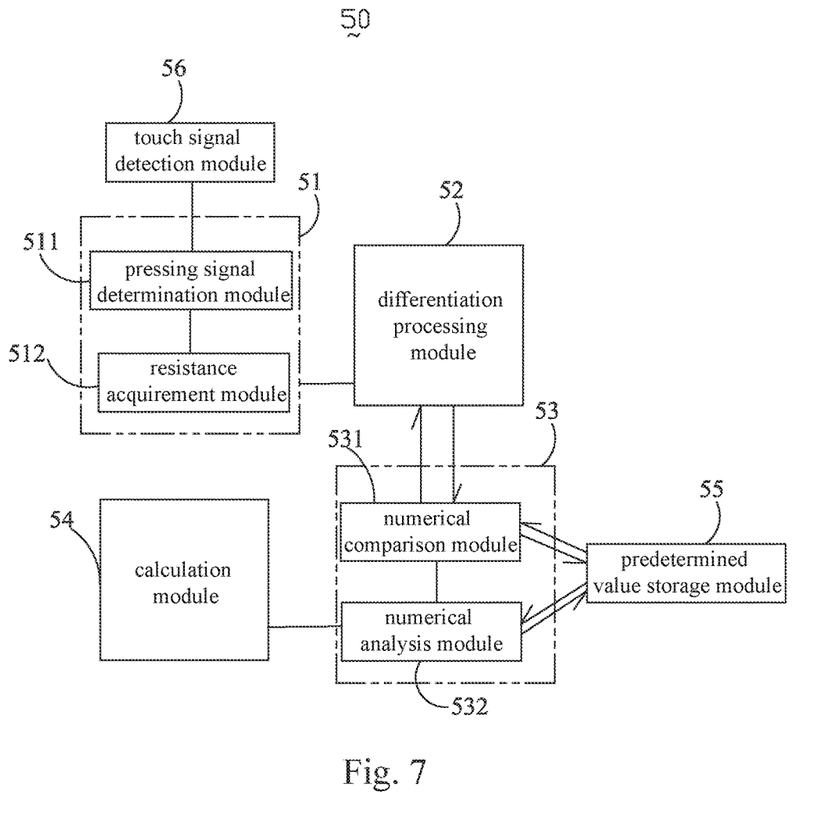
FIG. 7 is a structure diagram of at least one embodiment of the system for processing the pressure sensing signal.

Reference is made to FIG. 7. In some embodiments of the present disclosure, a pressure sensing signal processing system 50, sequentially including a resistance detection module 51, a differentiation processing module 52, a comparison reference module 53, and a calculation module 54, is provided. The pressure sensing signal processing system 50 further includes a predetermined value storage module 55 and a touch signal detection module 56.

More particularly, the resistance detection module 51 includes a pressing signal determination module 511 and a resistance acquirement module 512. The comparison reference module 53 includes a numerical comparison module 531 and a numerical analysis module 532.

The predetermined value storage module 55 is configured to store the predetermined values, such as the predetermined slope value $K_a$, the predetermined slope value $K_b$, the predetermined database described above, and so on.

The touch signal detection module 56 is configured to detect a finger touch signal.

The pressing signal determination module 511 is configured to determine continuously whether the touch signal detection module 56 detects the finger touch signal. The resistance acquirement module 512 is configured to acquire the initial resistance $R_0$ of the pressure sensitive module in the finger touch region and acquire the resistances $R_m$ in the different stages of the finger touching.

The numerical comparison module 531 is configured to match the slope value $k_m$ with the corresponding data in the predetermined database.

The numerical analysis module 532 is configured to compare and analyze the slope value $k_m$ and the data in the predetermined database, so as to acquire the pressing force gradient $\Delta F_n$ corresponding to the slope value $k_m$.

In the present disclosure, the connection between the pressure sensing signal processing system 50 and each module may be expressed as: the pressing signal determination module 511 is connected to the resistance acquirement module 512, and the resistance acquirement module 512 is connected to the differentiation processing module 52;

the differentiation processing module 52 is connected to the numerical comparison module 531, and two-way data transmission between the differentiation processing module 52 and the numerical comparison module 531 is realized;

the numerical comparison module 531 is connected to the numerical analysis module 532, and two-way data transmission is realized between the numerical comparison module 531 and the numerical analysis module 532;

in the predetermined values stored in the predetermined value storage module 55, when the numerical comparison module 531 or the numerical analysis module 532 is required to match with or calculate the predetermined values of the predetermined database stored in the predetermined value storage module 55, the relative data may be compared, matched or analyzed from the predetermined value storage module 55.

The numerical analysis module 532 is connected to the calculation module 54. The calculation module 54 includes a summation circuit (not shown in the figure). In the summation circuit, the pressing force gradient $\Delta F_n$ finally acquired from the comparison reference module 53 may be calculated through the equation (1) described above, so as to acquire the final pressing force $F_n$.

In some embodiments, the numerical comparison module 531 and the numerical analysis module 532 may provide the predetermined value storage module 55 with a calibration data, so the calibration data may be utilized for comparing and analyzing the slope value km in subsequent operations.

In some embodiments of the present disclosure, a resistance incremental calculation is utilized. The initial resistance may not be fixed, and such a pressure sensing signal processing can ignore the resistance variations due to manufacturing and the environment.

The pressure sensing signal processing method and the system of the present disclosure may have advantages as follow:

(1) The present disclosure provides the pressure sensing signal processing method, which may first-order differentiate the resistance-time curve and acquire the corresponding slope value $K_m$, and then match the slope value $K_m$ with the predetermined database and acquire the pressing force gradient $\Delta F_n$ corresponding to the slope value $K_m$. The pressing force $F_n$ is acquired based on the pressing force gradient $\Delta F_n$. Compared with the prior art, the present disclosure may certainly exclude noise signals generated by ambient factors by first-order differentiating the resistance-time curve, so as to determine the corresponding pressing force $F_n$ accurately. Therefore, the pressure sensing signal processing method may not specifically require certain materials or structures of the pressure sensitive module, and may also realize accurate detection and processing of the pressure sensing signals.

(2) The present disclosure provides the pressure sensing signal processing method, which may further include scanning the touch electrodes and determining whether the touched position signal is detected. As a result, the touched position signal detection may be a trigger signal to trigger the pressure sensing signal processing, so as to realize highly sensitive and accurate acquirement of the resistances and signals corresponding to the pressing force.

(3) The present disclosure provides the pressure sensing signal processing method, which may further include that determine the validity of the slope values $K_m$ corresponding to the pressing force. The determination of the validity of the slope values $K_m$ is to compare the slope value $k_m$ with the predetermined slope values $k_a$ and $k_b$ respectively, so as to accurately acquire the finger touch region and the variation of the slope value $k_m$ caused by the pressing. More particularly, the pressure sensing signal processing method may include comparing the slope value $k_m$ with the predetermined slope value $k_a$ or the predetermined slope value $k_b$, or sequentially comparing the slope value $k_m$ with the predetermined slope value $k_a$ or the predetermined slope value $k_b$.

The different methods to determine the validity of the slope values $K_m$ as described above may be alternatively applied for determining the validity of the slope values $K_m$ based on different resistance variation caused by ambient factors. The pressure sensing signal processing method may be applied to the pressure sensitive module having different ambient factors, and may determine the corresponding pressing force accurately.

(4) The present disclosure provides the pressure sensing signal processing method, which may further include that after matching the slope value $K_m$ with the predetermined database and acquiring the pressing force gradient $\Delta F_n$, the calculation of the equation of $F_n=F_{n-1}+\Delta F_n$ is processed. In this way, the pressing force $F_n$ corresponding to the practical pressing force may be acquired, so as to provide the highly accurate pressure sensing signal.

(5) The present disclosure provides the pressure sensing signal processing system 40, including the resistance detection module 41, the differentiation processing module 42, the comparison reference module 43 and the calculation module 44. Each of the modules may have different functions, and may be connected to each other tightly. Compared with the prior art, the present disclosure further includes the differentiation processing module 42, the comparison reference module 43 and the calculation module 44 corresponding to the differentiation processing module 42 and the comparison reference module 43, so as to realize the effective and accurate detection and processing of the pressure sensing signals.

(6) In the pressure sensing signal processing system 50 of the present disclosure, the resistance detection module 51 includes the pressing signal determination module 511 and the resistance acquirement module 512, which may realize continuously scanning of the touch electrodes and determine whether the touched position signal is detected, so as to acquire the resistance in the finger touch region. Therefore, the highly sensitive and accurate resistances and signals corresponding to the pressing force may be acquired.

(7) The pressure sensing signal processing system 50 may further include the predetermined value storage module 55. The comparison reference module 53 may further include the numerical comparison module 531 and the numerical analysis module 532. The predetermined value storage module 55 is respectively connected to the numerical comparison module 531 and the numerical analysis module 532, and the two-way data transmission may be realized. The connection described above may realize the numerical comparison module 531 and the numerical analysis module 532 to compare, match or analyze the relative data from the predetermined value storage module 55, so as to acquire the pressing force gradient $\Delta F_n$ corresponding to the slope value $k_m$.

(8) The calculation module 54 of the pressure sensing signal processing system 50 may further included the summation circuit (not shown in the figure). The pressing force $F_n$ corresponding to the practical pressing force may be acquired by the summation circuit, so as to provide the high accurate pressure sensing signal.

(9) The present disclosure provides the pressure sensing signal processing method and system, which may be applied to devices and equipment having the pressure sensitive function, so the devices and equipment may have better pressure sensitivity, and the accurate detection of the pressing force of the finger may be realized, so as to improve the satisfaction when the user using the pressure sensitive device. The pressure sensing signal processing method and system of the present disclosure may have better practical utility.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure.

What is claimed is:

1. A method for processing a plurality of pressure sensing signals, comprising:
    a touched position signal process, comprising:
        step S101: scanning a touch electrode; and
        step S102: proceeding to a subsequent operation if a touched position signal is detected; and
    a pressure sensing signal process, comprising:
        step Q11: acquiring a current pressure sensing signal of the plurality of pressure sensing signals and recording a pressure sensing signal-time curve;
        step Q12: first-order differentiating the pressure sensing signal-time curve to acquire a slope value;
        step Q13: matching the slope value with at least one predetermined database to acquire a pressing force gradient corresponding to the slope value; and
        step Q14: acquiring a current pressing force corresponding to the current pressure sensing signal based on a calculation of the pressing force gradient and a previous pressing force;
    wherein the touched position signal is a trigger signal to trigger an initiation of the pressure sensing signal process.

2. The method of claim 1, further comprising:
    step S103: acquiring a previous pressure sensing signal of the plurality of pressure sensing signals at a time point prior to occurrence of the current pressure sensing signal,
    wherein the step 103 is performed between the step S102 and the step Q11.

3. The method of claim 2, wherein the calculation in step Q14 is as follows:

$$F_n=F_{n-1}+\Delta F_n;$$

wherein $F_n$ represents the current pressing force, $F_{n-1}$ represents the previous pressing force corresponding to the previous pressure sensing signal, and $\Delta F_n$ represents the pressing force gradient, wherein the previous pressing force is predermined to be zero at an initial time point.

4. The method of claim 1, further comprising a step of:
    determining a validity of the slope value corresponding to a pressing object between the step Q12 and the step Q13.

5. The method of claim 4, wherein the step of determining the validity of the slope value corresponding to the pressing object further comprises at least one of the following steps:
    step S106: determining whether the slope value is greater than a first predetermined slope value, wherein the first predetermined slope value is greater than zero; and
    step S107: determining whether the slope value is less than a second predetermined slope value, wherein the second predetermined slope value is less than zero.

6. The method of claim 5, wherein in the case that the step of determining the validity of the slope value corresponding to the pressing object only comprises the step S106, the method further comprises:
proceeding to the step Q13 if the slope value is not greater than the first predetermined slope value.

7. The method of claim 5, wherein in the case that the step of determining the validity of the slope value corresponding to the pressing object only comprises the step S106, the method further comprises:
terminating the steps for processing the plurality of pressure sensing signals and outputting the current pressing force if the slope value is greater than the first predetermined slope value.

8. The method of claim 5, wherein in the case that the step of determining the validity of the slope value corresponding to the pressing object only comprises the step S107, the method further comprises:
proceeding to the step Q13 if the slope value is less than the second predetermined slope value.

9. The method of claim 5, wherein in the case that the step of determining the validity of the slope value corresponding to the pressing object only comprises the step S107, the method further comprises:
repeating the steps beginning from the step Q11 if the slope value is not less than the second predetermined slope value.

10. The method of claim 5, wherein in the case that the step of determining the validity of the slope value corresponding to the pressing object comprises the step S106 and the step S107, and in the case that the step S106 is performed prior to the step S107, the method further comprises:
proceeding to the step S107 if the slope value is not greater than the first predetermined slope value.

11. The method of claim 5, wherein in the case that the step of determining the validity of the slope value corresponding to the pressing object comprises the step S106 and the step S107, and in the case that the step S106 is performed prior to the step S107, the method further comprises:
terminating the steps for processing the plurality of pressure sensing signals and outputting the current pressing force if the slope value is greater than the first predetermined slope value.

12. The method of claim 5, wherein in the case that the step of determining the validity of the slope value corresponding to the pressing object comprises the step S106 and the step S107, and in the case that the step S106 is performed prior to the step S107, the method further comprises:
proceeding to the step Q13 if the slope value is less than the second predetermined slope value.

13. The method of claim 5, wherein in the case that the step of determining the validity of the slope value corresponding to the pressing object comprises the step S106 and the step S107, and in the case that the step S106 is performed prior to the step S107, the method further comprises:
repeating the steps beginning from the step Q11 if the slope value is not less than the second predetermined slope value.

14. The method of claim 5, wherein in the case that the step of determining the validity of the slope value corresponding to the pressing object comprises the step S106 and the step S107, and in the case that the step S107 is performed prior to the step S106, the method further comprises:
proceeding to the step S106 if the slope value is less than the second predetermined slope value.

15. The method of claim 5, wherein in the case that the step of determining the validity of the slope value corresponding to the pressing object comprises the step S106 and the step S107, and in the case that the step S107 is performed prior to the step S106, the method further comprises:
repeating the steps beginning from the step Q11 if the slope value is not less than the second predetermined slope value.

16. The method of claim 5, wherein in the case that the step of determining the validity of the slope value corresponding to the pressing object comprises the step S106 and the step S107, and in the case that the step S107 is performed prior to the step S106, the method further comprises:
proceeding to the step Q13 if the slope value is not greater than the first predetermined slope value.

17. The method of claim 5, wherein in the case that the step of determining the validity of the slope value corresponding to the pressing object comprises the step S106 and the step S107, and in the case that the step S107 is performed prior to the step S106, the method further comprises:
terminating the steps for processing the plurality of pressure sensing signals and outputting the current pressing force if the slope value is greater than the first predetermined slope value.

18. The method of claim 1, wherein the plurality of pressure sensing signals are resistance signals, current signals, or voltage signals.

19. The method of claim 1, further comprising: repeating the step S101 if no touched position signal is detected in the step S102.

* * * * *